United States Patent
Suzuki et al.

(10) Patent No.: US 6,916,062 B2
(45) Date of Patent: Jul. 12, 2005

(54) CABLE ARRANGING CONSTRUCTION

(75) Inventors: Shigeru Suzuki, Yokkaichi (JP);
Yoshinao Kobayashi, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/695,039

(22) Filed: Oct. 27, 2003

(65) Prior Publication Data

US 2004/0084932 A1 May 6, 2004

(30) Foreign Application Priority Data

Oct. 28, 2002 (JP) ........................................ 2002-312252

(51) Int. Cl.[7] .................................................. B60J 5/06
(52) U.S. Cl. ........................ 296/155; 296/208; 59/78.1; 191/12 C
(58) Field of Search ................................ 296/155, 208; 59/78.1; 191/12 C

(56) References Cited

U.S. PATENT DOCUMENTS

| | | | | |
|---|---|---|---|---|
| 4,672,805 A | * | 6/1987 | Moritz ........................ | 59/78.1 |
| 4,769,985 A | * | 9/1988 | Moritz ........................ | 59/78.1 |
| 4,988,838 A | * | 1/1991 | Kirtland .................... | 191/12 C |
| 5,332,865 A | * | 7/1994 | Jensen ........................ | 174/99 E |
| 5,343,989 A | * | 9/1994 | Hu et al. ................... | 191/12 R |
| 5,411,443 A | * | 5/1995 | Meier et al. ................ | 474/145 |
| 6,076,883 A | * | 6/2000 | Labonde et al. ............ | 296/155 |
| 6,174,020 B1 | | 1/2001 | Knettle et al. .............. | 296/155 |
| 6,215,068 B1 | * | 4/2001 | Meier ......................... | 174/68.1 |

FOREIGN PATENT DOCUMENTS

| | | |
|---|---|---|
| EP | 0 977 335 | 2/2000 |
| JP | 10-936 | 1/1998 |
| JP | 2000-50472 | 2/2000 |
| JP | 2002-17032 | 1/2002 |
| JP | 2002-233026 | 8/2002 |

* cited by examiner

*Primary Examiner*—Dennis H. Pedder
(74) *Attorney, Agent, or Firm*—Gerald E. Hespos; Anthony J. Casella

(57) ABSTRACT

A cable guide (1) has a plurality of tubular links (11) consecutively connected to one another for pivoting about substantially parallel axes. At least some of the cables to be inserted into a cable guide (1) are flat cables (5) placed one over another so that the width of the flat cables (5) is parallel to the pivotal axes of the links (11) of the cable guide (1).

10 Claims, 4 Drawing Sheets

CABLE ARRANGING CONSTRUCTION

BACKGROUND OF THE INVENTION

1. Field of the Invention

The invention relates to a construction for arranging cables in a cable guide, and particularly to a cable arranging construction between a vehicle body and a slide door.

2. Description of the Related Art

U.S. Pat. No. 6,174,020 discloses a construction that looks like part of a caterpillar tread for arranging ordinary cables of a substantially round cross-section. Japanese Unexamined Patent Publication No. 2002-233026, Japanese Unexamined Patent Publication No. 2002-17032, Japanese Unexamined Patent Publication No. H10-936 and Japanese Unexamined Patent Publication No. 2000-50472 disclose other known constructions for arranging cables.

A larger number of the cables leads to an increase in the number of the cables in the cable guide. Thus, a minimum bend radius of a possible bending deformation of a cable bundle is increased due to the increased number of the cables, thereby reducing a degree of freedom in the bending deformation of the cable guide. Further, the weight and the cross section of the cable bundle increase as the number of the cables increases. Thus, a cable arranging assembly using the cable guide becomes heavier and larger.

Accordingly, an object of the invention is to provide a cable arranging construction in which a cable arranging assembly using a cable guide has more freedom of bending deformation and can be made lighter and smaller.

SUMMARY OF THE INVENTION

The invention relates to a construction for arranging cables by inserting the cables into a cable guide. The construction comprises substantially tubular links coupled to undergo a bending deformation substantially in a plane. At least some of the cables inserted into the cable guide are flexible flat cables, each of which has conductors arranged substantially side by side.

Flexible flat cables placed one over another are lighter, cross-sectionally smaller and more flexible than a bundle of ordinary cables with the same number of conductors. Thus, the cable arranging assembly using the cable guide can have more freedom in bending deformation and can be lighter and smaller than the prior art construction where all cables in the cable guide have a round cross-section. As a result, there can be more cables without reducing the freedom of bending deformation of the cable arranging assembly while the weight and cross-sectional size of the assembly are suppressed.

Flat cables placed one over another can be bent with a smaller force as compared to a bundle of the ordinary cables. Thus, the cable guide can flexibly undergo a bending deformation with a smaller force.

The flat cables preferably are arranged in the cable guide so that a thickness direction substantially parallels a bending direction of the cable guide.

A partition may divide an inner space of each link into a first accommodating portion for inserting ordinary cables and a second accommodating portion for inserting the flat cables.

All of the cables to be inserted into the cable guide may be flat cables.

A sidewall of each link preferably has a slit for inserting the flat cable into the inner space of the linking member. The inner space preferably has a cable introducing portion and a cable holding portion. The cable holding portion preferably is at least as wide as the flat cables. However, the cable-introducing portion preferably is narrower than the flat cables.

The cable arranging construction may be adapted for arranging the cables between a vehicle body and a slide door.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
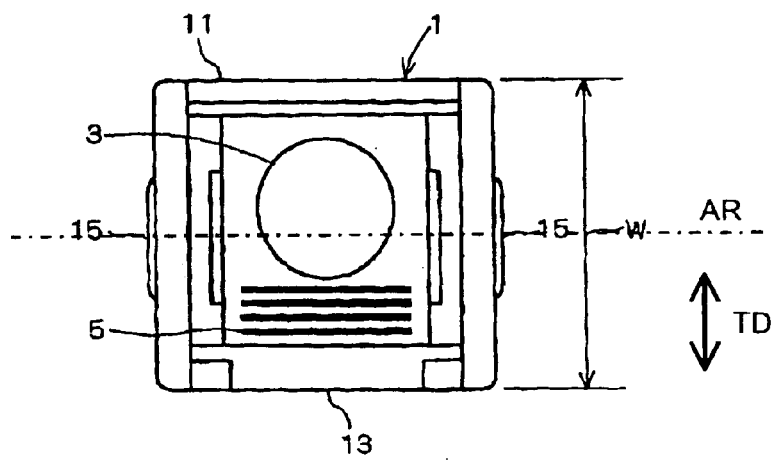
FIG. 1 is a diagram showing a cable arranging construction according to one embodiment of the invention.
Figure 2:
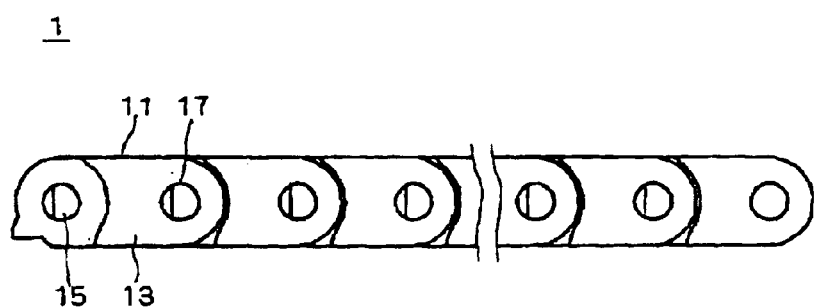
FIG. 2 is a diagram showing a construction of a cable guide.
Figure 3:
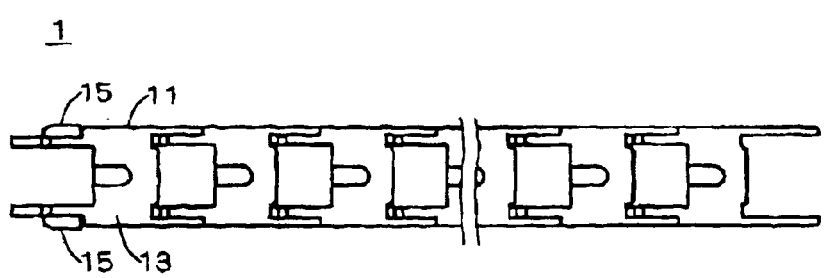
FIG. 3 is a diagram showing the construction of the cable guide.

A cable arranging construction according to the invention includes a cable guide 1 that resembles part of a caterpillar tread, as shown in FIGS. 1 to 3. The cable guide 1 is configured to receive a cable bundle 3 and a plurality of flat cables 5 placed substantially one over another. The cable bundle 3 comprises of a plurality of ordinary cables 3*a* (see FIG. 6) having a substantially round cross section. The ordinary cables 3*a* are likely to be power-supplying wires that require a specified capacity, whereas the flat cables 5 are likely to be signal wires that do not require a capacity. Alternatively, a single large cable 3*a* may be inserted into the cable guide instead of the cable bundle 3.

The cable guide 1 is formed by coupling links 11 to undergo a bending deformation substantially in a plane. Each link 11 has a trunk 13, two projections 15 at one end of the trunk 13, and two receiving holes 17 at the other end of the trunk 13. The receiving holes 17 are configured to pivotally receive the projections 15 of the mating link 11. The trunk 13 is a substantially rectangular tube, and has an inside dimensions to receive the cable bundle 3 and the flat cables 5.

Figure 4:
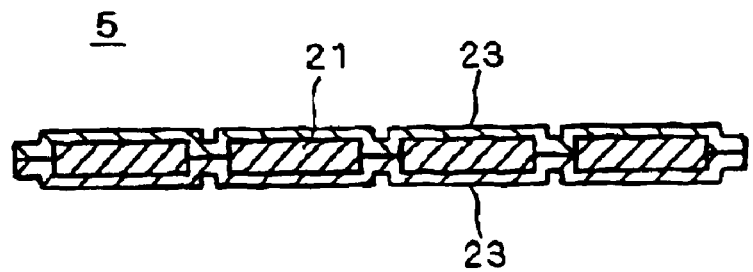
FIG. 4 is a section of a flat cable.

As shown in FIG. 4, the flat cable 5 is a thin flexible strip with conductors 21 of a flat rectangular cross section arranged substantially side by side. The conductors 21 are held between two insulation films 23. The flat cable 5 is thin and sufficiently flexible to undergo a bending deformation.

Figure 5:
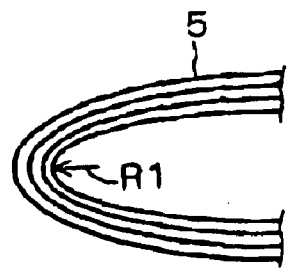
FIG. 5 shows flat cables placed one over another and bent.
Figure 6:
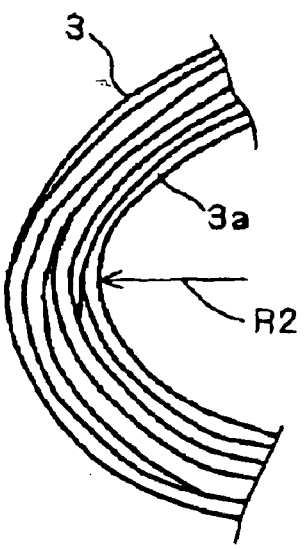
FIG. 6 is a diagram showing a bundle of bent ordinary cables is bent.

Minimum bend radii R1, R2 of possible bending deformations of the flat cables 5 and the cable bundle 3 are shown for comparison in FIGS. 5 and 6. The flat cables 5 are cross-sectionally smaller, lighter and capable of bending to a smaller bend radius R1 than the bundle 3 of the ordinary cables 3a having the same number of conductors, even when the flat cables 5 are placed one over another.

The flat cables 5 are inserted substantially one over another into the cable guide 1 together with the cable bundle 3 so that a thickness direction TD of the flat cables 5 is substantially parallel with a bending direction of the cable guide 1. In this regard, the thickness direction TD of the flat cables 5 is a direction in which the flat cables 5 are easily bendable, and is substantially perpendicular to the axis of rotation or pivotal movement AR defined by the projections 15 and receiving portions 17.

Figure 7:
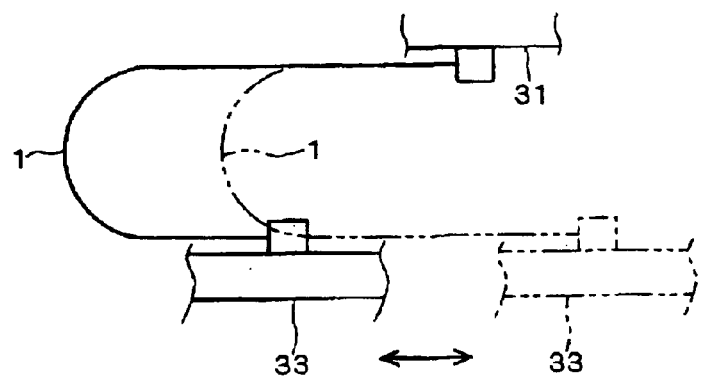
FIG. 7 is a diagram showing an application example of the cable arranging construction of FIG. 1.

The cable arranging construction can be applied between a fixed first structure (e.g. vehicle body) 31 and a second structure (e.g. slide door) 33 slidably provided on the first structure 31, as shown in FIG. 7. Thus, opposite ends of the cable guide 1 are coupled to both structures 31, 33 and the bent states of the cable guide 1, the cable bundle 3 and the flat cables 5 inserted into the cable guide 1 change as the second structure 33 moves.

Some of the cables inserted into the cable guide 1 are flat cables 5. Thus, a cable arranging assembly using the cable guide 1 has a higher degree of freedom of bending deformation and is lighter and smaller as compared to the prior art where all cables in the cable guide 1 are ordinary cables 3 with a substantially round cross section. The width W of the cable guide 1 along the bending direction of the cable guide 1 is reduced significantly. As a result, the number of the cables can be increased without reducing the degree of freedom in the bending deformation of the cable arranging assembly while the weight and the cross-sectional size of the cable arranging assembly are suppressed.

The flat cables 5 placed substantially one over another can be bent with a smaller force as compared to the cable bundle 3. Thus, the cable guide 5 can flexibly undergo a bending deformation with a smaller force. For example, the second structure 33 of FIG. 7 can be slid with a smaller driving force (door sliding force) because a load exerted on the structure 33 by the cable guide 1 having the flat cables 5 therein is low.

Figure 8:
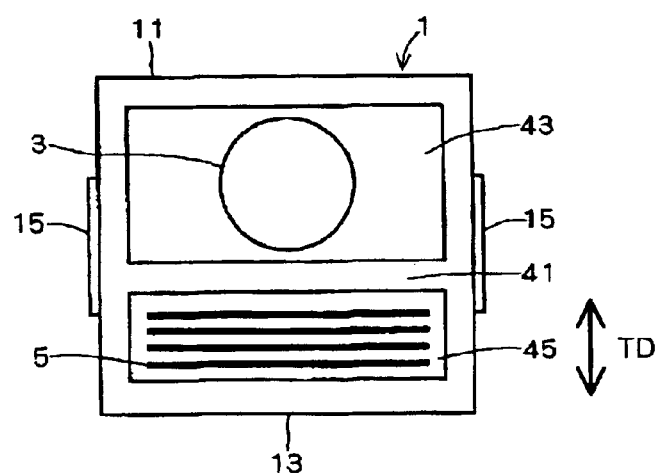
FIG. 8 is a diagram showing a modification of the cable arranging construction of FIG. 1.

FIG. 8 shows an alternate embodiment where a partition 41 divides an inner space of the trunk 13 of each link 11 of the cable guide 1 into a first accommodating portion 43 for the ordinary cables 3 and a second accommodating portion 45 for the flat cables 5. Thus, mutual interference (e.g. abrasion) of the ordinary cables 3a and the flat cables 5 in the cable guide 1 is prevented.

Figure 9:
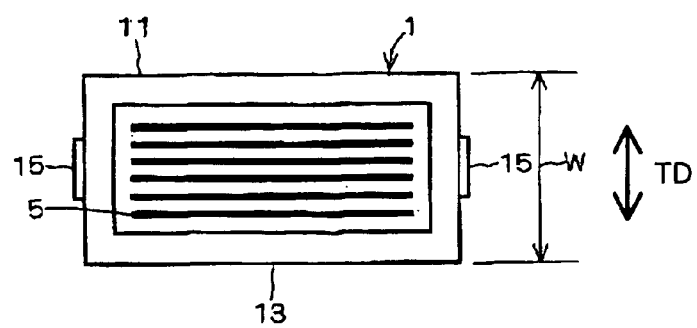
FIG. 9 is a diagram showing another modification of the cable arranging construction of FIG. 1.

FIG. 9 shows an embodiment where all of the cables inserted into the cable guide 1 are flat cables 5. In this case, the degree of freedom in the bending deformation, the weight, the cross section and the like are improved further. Additionally, the width W of the cable guide 1 can be reduced to half or smaller as compared to the case where only the ordinary cables 3a are used.

Figure 10:
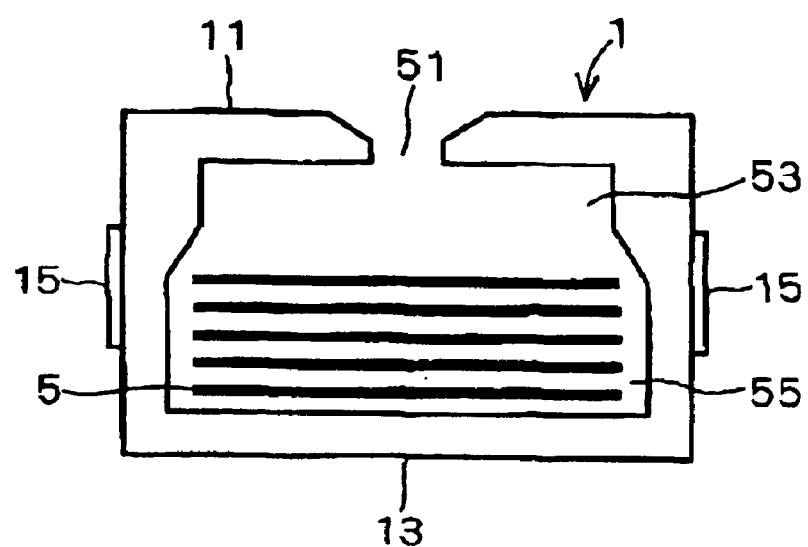
FIG. 10 is a diagram showing still another modification of the cable arranging construction of FIG. 1.

FIG. 10 shows an embodiment where all of the cables inserted into the cable guide 1 are flat cables 5, and a side wall (one of two side walls facing each other along the bending direction of the cable guide 1) of the trunk 13 of each link 11 of the cable guide 1 has a slit 51 for inserting the flat cable 5 into the inner space of the trunk 13. The inner space of the trunk 13 becomes gradually wider at an intermediate portion when viewed from the slit 51. A front part of the inner space, when viewed from the slit 51, defines a cable-introducing portion 53, and a rear part of the inner space defines a cable holding portion 55. The cable holding portion 55 is at least as wide as the flat cables 5, whereas the cable-introducing portion 53 is narrower than the flat cables 5. Thus, the flat cable 5 inserted into the cable holding portion 55 through the slit 51 and the cable-introducing portion 53 can be held stably in the cable holding portion 55. This embodiment achieves the same effects as the embodiment shown in FIG. 9, and the flat cables 5 can be inserted easily into the cable guide 1 through the slits 51 in the links 11.

As described above, at least some of the cables inserted into the cable guide 1 are flexible flat cables 5. The flat cables 5 undergo a bending deformation more flexibly and at a smaller bend radius R1 than a cable bundle 3 of ordinary cables 3a having the same number of conductors, even when the flat cables 5 are placed one over another. Additionally, the flexible flat cables 5 are lighter and have a smaller cross section than a cable bundle 3 of ordinary cables 3a having the same number of conductors. Thus, the cable arranging assembly using the cable guide 1 has a degree of freedom in the bending deformation and can be made lighter and smaller as compared to a case where all the cables to be inserted into the cable guide are ordinary cables having a substantially round cross section, as in the prior art. As a result, the number of cables can be increased with without reducing the degree of freedom in the bending deformation of the cable arranging assembly while the weight and the cross-sectional size of the cable arranging assembly are suppressed.

The flat cables 5 placed one over another can be bent with a smaller force as compared to the cable bundle 3 of the ordinary cables 3a. Thus, the cable guide 1 can flexibly undergo a bending deformation with a smaller force.

The inner space of each link 11 of the cable guide 1 can be divided by the partition into the first accommodating portion 43 for the ordinary cables 3 having a substantially round cross section and the second accommodating portion 45 for the flat cables 5. Thus, mutual interference (e.g. abrasion) of the ordinary cables 3a and the flat cables 5 in the cable guide 1 is prevented.

All of the cables inserted into the cable guide 1 preferably are flat cables 5. Thus, the cable arranging assembly can be improved further in terms of the degree of freedom in the bending deformation, the weight, the cross-sectional size and the like.

The sidewall of each link 11 preferably is formed with the slit 51 for inserting the flat cables 5. Thus, the flat cables 5 can be inserted easily into the cable guide 1.

What is claimed is:

1. A cable arranging construction for arranging a plurality of cables in a cable guide comprising: a plurality of substantially tubular links, each said link having opposite ends defining a longitudinal direction and a cable accommodating portion extending longitudinally through the link and between the ends, the links being consecutively coupled for bending substantially in a plane and about substantially parallel axes, at least some of the cables inserted into the cable guide being flexible flat cables having a plurality of conductors arranged substantially side by side in a width direction, the flexible flat cables being stacked in a parallel array with the width directions being substantially parallel to the bending axes of the links, wherein each link has a sidewall extending parallel to the bending axes, the sidewall being formed with a slit extending between the opposite ends of the link and dimensioned for inserting the flat cable into the cable accommodating portion of the link.

2. A cable arranging construction for arranging a plurality of cables in a cable guide comprising: a plurality of substantially tubular links, each said link having opposite ends defining a longitudinal direction and a cable accommodating portion extending longitudinally through the link and between the ends, the links being consecutively coupled for bending substantially in a plane and about substantially parallel axes, at least some of the cables inserted into the cable guide being flexible flat cables having a plurality of conductors arranged substantially side by side in a width direction, the flexible flat cables being stacked in a parallel array with the width directions being substantially parallel to the bending axes of the links, wherein the cable accommodating portion of each link includes a partition extending parallel to the axes and dividing the inner space into a first accommodating portion for round cables and a second accommodating portion for the flat cables.

3. The cable arranging construction of claim 1, wherein all of the cables in the cable guide are flat cables.

4. The cable arranging construction of claim 1, wherein the cable accommodating portion comprises a cable-introducing portion narrower than a width dimension of the flat cable and a cable holding portion at least as wide as the flat cable.

5. The cable arranging construction of claim 1, wherein the cable-introducing portion is between the slit and the cable holding portion.

6. A cable guide comprising: a plurality of substantially tubular intermediate links pivotally connected consecutively to one another, a substantially tubular vehicle body link pivotally connected to a first of said intermediate links and pivotally connectable to a vehicle body, a substantially tubular sliding door link pivotally connectable to a second of said intermediate links and pivotally connectable to a sliding door of the vehicle body, pivotal connections between the links being about substantially parallel axes, a plurality of flexible flat cables extending through said links for connecting the sliding door to the vehicle body, each of said cables having a width direction substantially parallel to the axes of the pivotal connections between the links, wherein an inner space of each link includes a partition extending parallel to the axes and dividing the inner space into a first accommodating portion for round cables and a second accommodating portion for the flat cables.

7. The cable guide of claim 6, wherein each of said links has a sidewall aligned substantially parallel to the axes of pivotal connections between the links, each said sidewall being formed with a slit dimensioned for inserting the flat cable into an inner space of the link.

8. The cable guide of claim 7, wherein the inner space comprises an introducing portion narrower than the flat cable and a holding portion at least as wide as the flat cable, the introducing portion being between the slit and the holding portion.

9. A cable guide for a plurality of flexible flat cables, each of said flexible flat cables having a width and a thickness, the cable guide comprising: a plurality of substantially tubular links pivotally connected consecutively to one another for pivoting about substantially parallel axes, each said tubular link having an inner space, a sidewall of each link aligned parallel to the axes being formed with a slit extending into the inner space and having a width exceeding the thickness of the flexible flat cable, the inner space comprising a holding portion at least as wide as the width of the flexible flat cable.

10. The cable guide of claim 9, further comprising an introducing portion narrower than the width of the flexible flat cable, the introducing portion being between the slit and the holding portion.

\* \* \* \* \*